United States Patent
Hong et al.

(10) Patent No.: US 11,435,226 B2
(45) Date of Patent: Sep. 6, 2022

(54) QUANTUM EFFICIENCY MEASURING INSTRUMENT AND METHOD FOR PHOTOVOLTAIC DETECTORS ON INDIVIDUAL LASER PULSES

(71) Applicant: KOREA RESEARCH INSTITUTE OF STANDARDS AND SCIENCE, Daejeon (KR)

(72) Inventors: Kee-Suk Hong, Daejeon (KR); Dong-Hoon Lee, Daejeon (KR); Seongchong Park, Daejeon (KR); Jisoo Hwang, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 796 days.

(21) Appl. No.: 16/403,382

(22) Filed: May 3, 2019

(65) Prior Publication Data
US 2019/0341734 A1 Nov. 7, 2019

(30) Foreign Application Priority Data
May 4, 2018 (KR) .................. 10-2018-0051522

(51) Int. Cl.
*G01J 1/42* (2006.01)
*G06N 10/00* (2022.01)
*G01J 1/16* (2006.01)
*G01J 3/42* (2006.01)

(52) U.S. Cl.
CPC .......... *G01J 1/4228* (2013.01); *G01J 1/1626* (2013.01); *G01J 1/4257* (2013.01); *G01J 3/42* (2013.01); *G06N 10/00* (2019.01); *G01J 2003/423* (2013.01)

(58) Field of Classification Search
CPC ...... G01J 1/4228; G01J 1/1626; G01J 1/4257; G01J 3/42; G01J 2003/423; G06N 10/00
See application file for complete search history.

(56) References Cited

U.S. PATENT DOCUMENTS

2011/0279810 A1* 11/2011 Wang .................. G01R 31/26 356/72

OTHER PUBLICATIONS

John Lehman, George Eppeldauer, J. Andrew Aust, and Miklos Racz, "Domain-engineered pyroelectric radiometer," Appl. Opt. 38, 7047-7055 (1999) (Year: 1999).*

(Continued)

*Primary Examiner* — Thanh Luu
*Assistant Examiner* — Monica T Taba
(74) *Attorney, Agent, or Firm* — Knobbe Martens Olson & Bear LLP

(57) ABSTRACT

Provided are an apparatus and method for measuring quantum efficiency of a detector using a single pulse laser. Quantum efficiency of the measurement target detector may be measured from 420 nm to 1600 nm having uncertainty of 2% to 4% (K=2) by comparing the reference detector and the measurement target detector significantly different in sensitivity using a single laser pulse as a spectral light source. Also, it is possible to directly compare the two detectors with a significant difference in sensitivity through a very simple setup that causes a portion of a laser pulse output from a light source part to be absorbed by the reference detector and the laser pulse reflected from the reference detector to be irradiated to the measurement target detector.

8 Claims, 8 Drawing Sheets

(56) References Cited

OTHER PUBLICATIONS

Hong et al., "Spectral responsivity measurement of photovoltaic detectors by comparision with a pyroelectric detector an individual nano-second laser pulses", Metrologia, vol. 54—11 pages (May 11, 2017).

\* cited by examiner

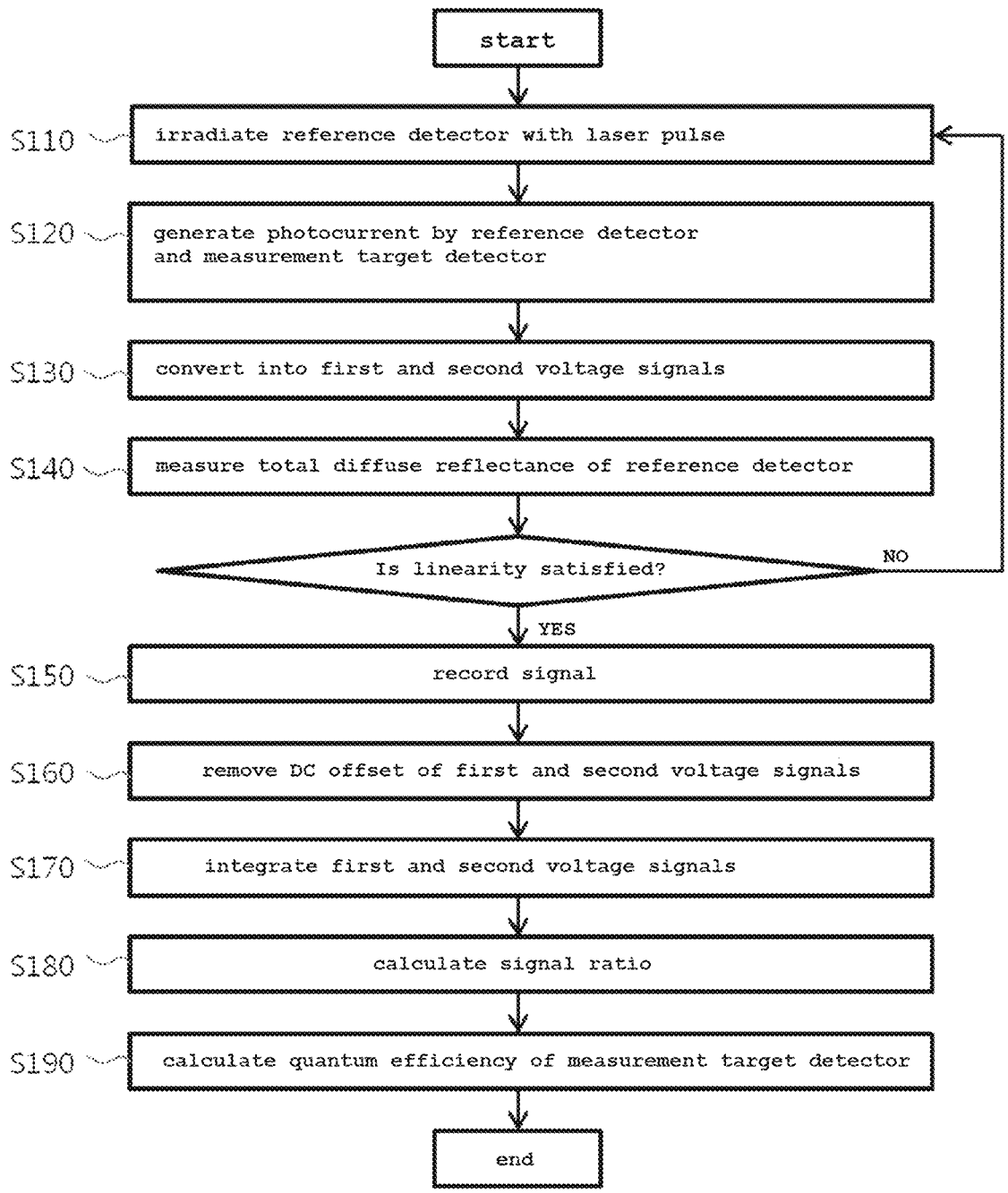

QUANTUM EFFICIENCY MEASURING INSTRUMENT AND METHOD FOR PHOTOVOLTAIC DETECTORS ON INDIVIDUAL LASER PULSES

CROSS-REFERENCE TO RELATED APPLICATIONS

This application claims priority under 35 U.S.C. § 119 to Korean Patent Application No. 10-2018-0051522, filed on May 4, 2018, in the Korean Intellectual Property Office, the disclosure of which is incorporated herein by reference in its entirety.

TECHNICAL FIELD

The following disclosure relates to an apparatus and method for measuring quantum efficiency of a detector.

BACKGROUND

Quantum efficiency of a photodetector, which is one of the important quantities in optical measurement, refers to an output photocurrent value (unit A) regarding an input radiant flux (unit W) at each wavelength. Absolute measurement of quantum efficiency has been performed using a very low temperature absolute radiometer, which is a starting point of optical measurement graduation realization in many national measurement organizations, but, in general, a comparison method has widely been applied.

SUMMARY

An embodiment of the present invention is directed to providing an apparatus and method for measuring quantum efficiency of a measurement target detector by using a single laser pulse output from a wavelength variable nanosecond laser as a spectral light source and by comparing signal values, for the single laser pulse, of a reference detector and the measurement target detector which are very different in sensitivity. An embodiment is directed to an apparatus and method for measuring quantum efficiency of a photovoltaic detector by comparing the photovoltaic detector with a pyroelectric detector using a single pulse of a nanosecond laser.

In one general aspect, an apparatus for measuring quantum efficiency of a detector includes: a light source part outputting a laser pulse; a reference detector absorbing a portion of the laser pulse output from the light source part and converting the absorbed portion of the laser pulse into a current signal; a measurement target detector absorbing a laser pulse reflected from the reference detector and converting the absorbed laser pulse into a current signal; a first amplifier amplifying the current signal generated by the reference detector to a first voltage signal; a second amplifier amplifying the current signal generated by the measurement target detector to a second voltage signal; and a signal processing part recording the first voltage signal and the second voltage signal and calculating quantum efficiency of the measurement target detector.

The apparatus may further include: an optical fiber coupling the laser pulse output from the light source part to fix a position of the laser pulse and maintaining a circular shape.

The signal processing part may include: a recording part recording the first voltage signal and the second voltage signal and a total diffuse reflectance of the reference detector; an offset removing part removing a DC offset of the first voltage signal and the second voltage signal; an integrating part integrating the first and second voltage signals from which the DC offset was removed by the offset removing part; a signal ratio calculating part calculating a signal ratio; and a quantum efficiency calculating part calculating relative quantum efficiency of the measurement target detector through the total diffuse reflectance of the reference detector and the signal ratio.

The measurement target detector may be disposed to form a predetermined incident angle with respect to a normal of a surface of the reference detector when a laser pulse output from the light source part is incident on the surface of the reference detector and absorbs a laser pulse passing on a straight line forming the same angle of reflection as the incident angle.

The signal processing part may include a linearity determining part determining whether the first voltage signal and the second voltage signal are measured within a linear dynamic range of the reference detector, the measurement target detector, the first amplifier, and the second amplifier.

In another general aspect, a method for measuring quantum efficiency of a detector through the detector quantum efficiency measuring apparatus using a single pulse laser includes: irradiating a reference detector with a laser pulse output from the light source; absorbing, by the reference detector, a portion of the laser pulse output from the light source part to generate a photocurrent, and absorbing, by the measurement target detector, a laser pulse reflected from the reference detector to generate a photocurrent; converting, by first and second amplifiers, the photocurrent signals generated by the two detectors into first and second voltage signals; measuring a total diffuse reflectance of the reference detector; recording the first and second voltage signals and a total diffuse reflectance of the reference detector; removing a DC offset of the first voltage signal and the second voltage signal; integrating the DC offset-removed first and second voltage signals; calculating a signal ratio; and calculating relative quantum efficiency of the measurement target detector through the total diffuse reflectance of the reference detector and the signal ratio.

The method may further include: determining whether the first voltage signal and the second voltage signal are measured within a linear dynamic range of the reference detector, the measurement target detector, the first amplifier, and the second amplifier.

The method may further include: coupling the laser pulse output from the light source part to an optical fiber.

BRIEF DESCRIPTION OF THE DRAWINGS

FIG. 8 is a flowchart illustrating a method of measuring quantum efficiency of a detector using a single pulse laser according to an embodiment of the present invention.

DETAILED DESCRIPTION OF EMBODIMENTS

Hereinafter, embodiments will be described in detail with reference to the accompanying drawings.

In one implementation of a comparison method, for a spectral light source outputting monochromatic light, a signal ratio between an indication value of a detector under test (DUT) and an indication value of a reference detector REF is measured. According to the method, a combination of a tungsten lamp operated as continuous light and a diffraction grating spectrometer is used as a spectral light source, and thus, in the case of creating monochromatic light having a spectral line width of 5 nm or less, it is difficult for a radiant exitance to exceed 1 µW in each wavelength, and thus, it is difficult to directly measure a signal from a detector, excluding a photodiode having very high sensitivity. For example, a pyroelectric detector has quantum efficiency irrespective of wavelength, thus being very useful as a reference detector for quantum efficiency measurement, but there is no way of directly measuring a signal ratio with any other optical diode with the spectral light source of the method. Of course, a wavelength variable laser operating as a continuous wave (CW) may be used; however, in order to select a desired wavelength in a wide region, a very high-priced laser may be required and an error factor such as an interference phenomenon or the like may occur.

Figure 1:
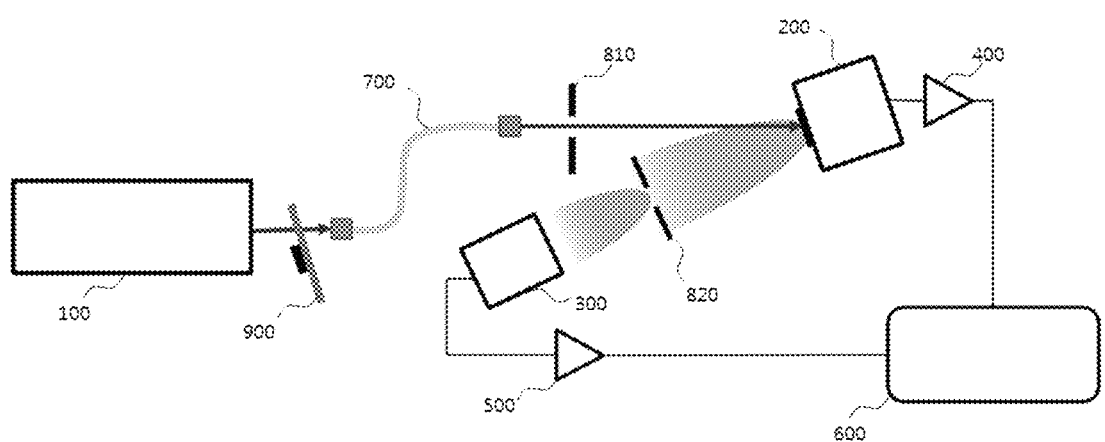
FIG. 1 is a schematic block diagram of an apparatus for measuring quantum efficiency of a detector using a single pulse laser according to an embodiment of the present invention.

FIG. 1 is a schematic block diagram of an apparatus for measuring quantum efficiency of a detector using a single pulse laser according to an embodiment of the present invention.

Referring to FIG. 1, a light source part 100 may use an optical parametric oscillator (OPO) that pumps a 355 nm Nd:YAG tertiary harmonic wave operating as a Q-switch as a spectral light source of a laser pulse. The OPO is designed to provide a signal pulse and am idler pulse at adjustable wavelengths from 405 nm to 709 nm and from 710 nm up to 2600 nm, respectively, at a repetition rate of 1 kHz. The OPO also includes a secondary harmonic generation of a signal pulse covering a UV range from 210 nm to 350 nm. Pulse energy of an output laser pulse depends strongly on a wavelength and is measured as 100 µJ near 500 nm, 20 µJ near 1200 nm, and 5 µJ near 300 nm.

Figure 2:
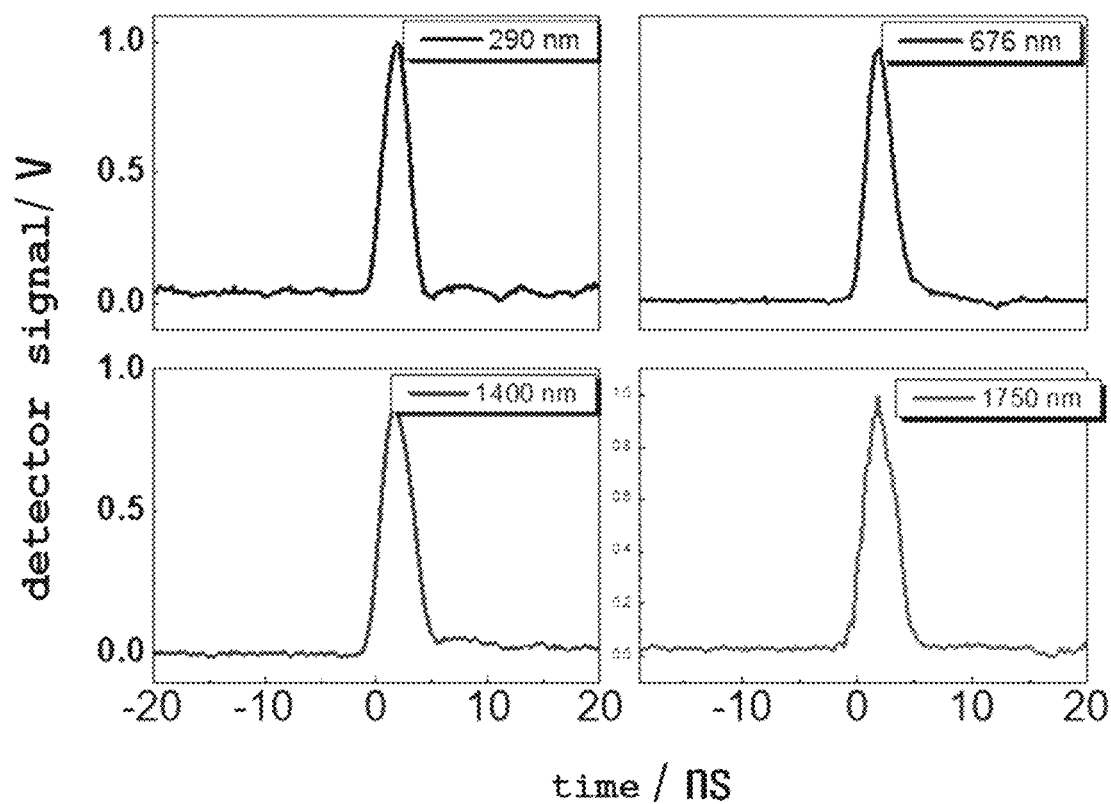
FIG. 2 is a diagram illustrating profiles of laser pulses at wavelengths of 290 nm, 676 nm, 1400 nm, and 1750 nm output from a single pulse laser according to an embodiment of the present invention.

FIG. 2 is a diagram illustrating profiles of laser pulses at wavelengths of 290 nm, 676 nm, 1400 nm, and 1750 nm output from a single pulse laser according to an embodiment of the present invention.

Referring to FIG. 2, time profiles at wavelengths of 290 nm, 676 nm, 1400 nm, and 1750 nm of laser pulses output from the light source part 100 using a high-speed Si photodiode and a high-speed InGaAs photodiode as detectors are illustrated, and a time width of each pulse in the wavelength range of 250 nm to 1600 nm, particularly concerning detector quantum efficiency measurement, is measured to be smaller than 5 ns. Spectrum widths of the OPO pulses are 0.08 nm, 0.14 nm, and 0.48 nm at wavelengths of 350 nm, 600 nm, and 1100 nm, respectively.

In order to accurately realize the apparatus according to the embodiment of FIG. 1, a laser pulse light needs to be smaller than a size of an active region of the detector to provide a stable beam profile on a surface of a reference detector. If reflectance of the surface of the detector is not perfectly uniform, any change in a position of a laser light and the profile may cause a measurement error. In the case of free space output light of the OPO laser used in the embodiment of the present invention, it was observed that a position, a shape, and a size of light significantly changed in the detector according to wavelengths, and also, light conditions undergo a considerable change when wavelengths are shifted from a secondary harmonic range (210 nm to 350 nm) to a signal pulse range (405 nm to 709 nm) or to an idler pulse range (710 nm to 2600 nm). In order to address the foregoing, as illustrated in FIG. 1, an optical fiber 700 and apertures 810 and 820 may be used. The optical fiber 700 may be a multimode optical fiber having a core diameter of 400 µm coupled to a collimator lens (f=50 mm) and the aperture. The optical fiber 700 fixes a position of light in a defined direction and maintains a shape of light to a circular shape (collimated round beam). An output beam from the OPO is coupled to the optical fiber using a focusing lens (f=35 mm), and overall light alignment is optimized to minimize a change in the light profile regarding a wavelength and monitored at a position of a reference detector using a CCD camera. Also, at least one of a first aperture 810 located between the optical fiber and the reference detector and adjusting a size of laser pulse light and a second aperture 820 located between the reference detector and a measurement target detector and adjusting a size of light reflected from the reference detector may be used. A residual change of the light profile regarding the wavelength after optimization is checked as a diameter of light from wavelength 420 nm to wavelength 1000 nm is determined as (1.4±0.1) mm. However, the multimode optical fiber limits a wavelength range of quantum efficiency measurement. The reason is because transmittance of the optical fiber for a wavelength of 400 nm or less is so low that radiant power after the optical fiber cannot be accurately measured by the reference detector. Thus, the wavelength range may be directly expanded by replacing the optical fiber with another multimode optical fiber having improved ultraviolet transmittance.

Additional consideration for the light source used for light measurement is directed to temporal stability of radiant power. The OPO light source used in an embodiment of the present invention is pumped by a Q-switch laser so that energy of each pulse changes randomly and the average of the radiant power is unstable. Experiments show that the pulse energy of the output pulses of the OPO may vary by ±10% or more per pulse. However, it should be emphasized that the pulse-to-pulse instability of pulse energy does not affect measurement accuracy as described below. This is because the ratio of the two detectors being compared is measured for each individual pulse. The requirement for validity of a measurement equation derived below is that incident pulse energy needs to be within a linear dynamic range of the detector and an amplifier.

In response to the incident laser pulse output from the light source part 100, a reference detector 200 and a measurement target detector 300 generate photocurrent (pulse) signals $I_{ref}(t)$ and $I_{test}(t)$, respectively. The reference detector 200 may be used as a pyroelectric detector having an active area diameter of 10 mm and the measurement target detector 300 may be used as a Si photodiode and a Ge photodiode having an active area of 10 mm×10 mm.

The photocurrent signals $I_{ref}(t)$ and $I_{test}(t)$ generated by the reference detector 200 and the measurement target detector 300 are respectively converted into first and second voltage signals by first and second amplifiers 400 and 500, respectively. The first amplifier 400 is used as a high-speed amplifier having a gain-bandwidth product of 100 MHz to further amplify a voltage signal from the reference detector amplified by an amplifier inside the reference detector and output a first voltage signal $V_{ref}(t)$. The second amplifier 500 may be a high speed trans-impedance amplifier having a gain-bandwidth product of 200 MHz to convert the photocurrent signal $I_{test}(t)$ to a second voltage signal $V_{test}(t)$. The sufficiently high gain-bandwidth product of the amplifier ensures a predetermined gain for the photocurrent input and becomes a condition satisfying the validity of Equation 1.

Figure 3:
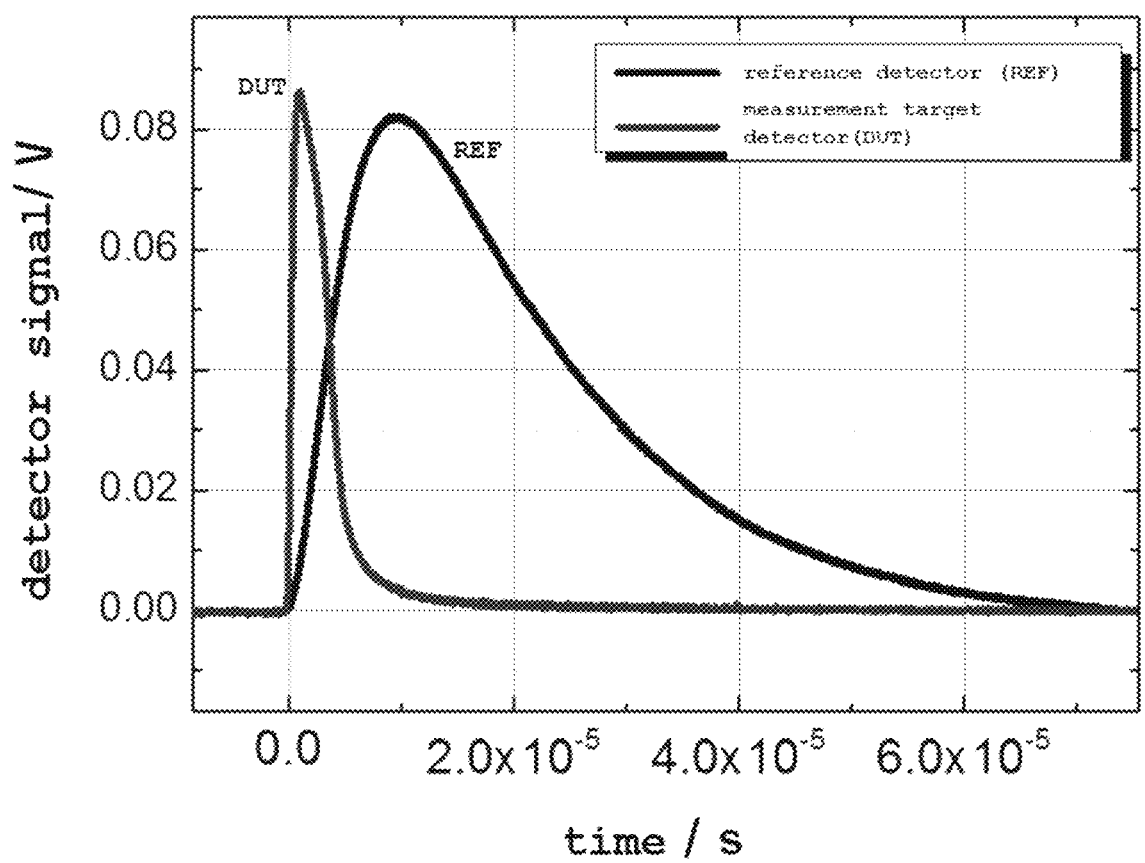
FIG. 3 is a diagram illustrating first and second voltage signals at a wavelength of 1000 nm.

FIG. 3 shows first and second voltage signals at a wavelength of 1000 nm.

Referring to FIG. 3, an example of a first voltage signal $V_{ref}(t)$ and a second voltage signal $V_{test}(t)$ obtained by converting, by first and second amplifiers, photocurrent pulse signals generated by the reference detector and the measurement target detector is shown. The first voltage signal $V_{ref}(t)$ and the second voltage signal $V_{test}(t)$ are data for determining whether they have been measured within a linear dynamic range of the detectors and the amplifiers and recorded in a recording portion of a signal processing part 600 to calculate a signal ratio and quantum efficiency of the measurement target detector.

Before describing a configuration of the signal processing part 600 according to an embodiment of the present invention, the principle of the apparatus and method for measuring quantum efficiency of the measurement target detector with a single laser pulse will be described and measurement equations will be derived.

Figure 4:
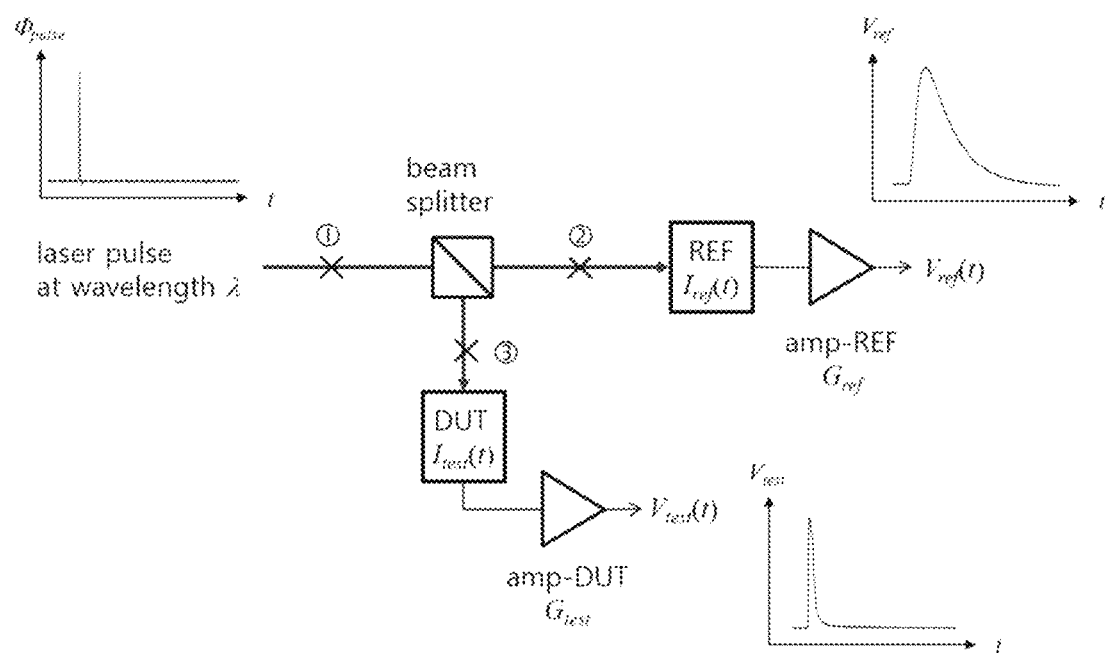
FIG. 4 is a conceptual diagram of a setup using a beam splitter to illustrate the principle of measuring quantum efficiency of a detector.

FIG. 4 is a conceptual diagram of a setup using a beam splitter to illustrate the principle of measuring quantum efficiency of a detector.

Referring to FIG. 4, a laser pulse having a time width of less than 10 ns at a wavelength $\lambda$ is divided into two pulses by a beam splitter, as transmission and reflection, and the two pulses are transmitted to a reference detector and a measurement target detector, respectively. If radiant power of the laser pulse over time at position ① in FIG. 4 is $\Phi(t, \lambda)$, radiant powers at positions ② and ③ for transmittance $\tau(\lambda)$ and reflectance $\rho(\lambda)$ of the beam splitter are $\tau(\lambda)\cdot\Phi(t,\lambda)$ and $\rho(\lambda)\cdot\Phi(t,\lambda)$ at wavelength $\lambda$, respectively. In response to the input pulses, the reference detector and the measurement target detector generate photocurrent signals $I_{ref}(t)$ and $I_{test}(t)$ over time, respectively. These signals are converted into the first voltage signal $V_{ref}(t)$ and the second voltage signal $V_{test}(t)$ by the first and second amplifiers having gains $G_{ref}$ and $G_{test}$, respectively. The first and second voltage signals are recorded by the recording part of the signal processing part 600 and the graph of FIG. 4 indicates that the pulses of the recorded voltage signals are wider as compared with the laser pulses due to a limited bandwidth of the detectors and the amplifiers. An integrating part of the signal processing part 600 integrates the recorded $V_{ref}(t)$ and $V_{test}(t)$ during a time interval T at the wavelength $\lambda$ to obtain signals $y_{ref}$ and $y_{test}$. A signal ratio $r(\lambda)$ of the two detectors may be written as follows.

$$r(\lambda) \equiv \frac{y_{test}}{y_{ref}} = \frac{\int_T V_{test}(t)dt}{\int_T V_{ref}(t)dt} = \frac{G_{test}}{G_{ref}} \cdot \frac{\int_T I_{test}(t)dt}{\int_T I_{ref}(t)dt} \quad \text{[Equation 1]}$$

Here, it is assumed that the gains $G_{ref}$ and $G_{test}$ are time-independent. This is an actual condition under which the first and second voltage pulse signals are converted within the linear dynamic range of the amplifiers.

Considering the definition of quantum efficiency of the photodetector with respect to the input radiant power, $S(\lambda) \equiv I/\Phi(\lambda)$, and when impulse response functions $h_{test}(t)$ and $h_{ref}(t)$ are substituted for the respective detectors, Equation 1 may be rewritten as the following equation.

$$r(\lambda) = \frac{G_{test}}{G_{ref}} \cdot \frac{p(\lambda)}{\tau(\lambda)} \cdot \frac{\int_T S_{test}(\lambda) \cdot [\Phi(t, \lambda) * h_{test}(t)]dt}{\int_T S_{ref}(\lambda) \cdot [\Phi(t, \lambda) * h_{ref}(t)]dt} \quad \text{[Equation 2]}$$

Here, it is assumed that the beam splitter is linear with respect to the input pulse, and $\Phi(t)*h(t)$ denotes a convolution ($\Phi(t)*h(t)=\int\Phi(t')h(t-t')dt'$) of the input laser pulse and impulse response functions of the detectors.

When the radiant power of the pulse $\Phi(t, \lambda)$ is limited within the linear dynamic range of the detectors, the quantum efficiencies $S_{test}(\lambda)$ and $S_{ref}(\lambda)$ are time-independent and thus they may be removed from the integral. Thereafter, $\int_T \Phi(t,\lambda)*h_{test}(t)dt = \int_T \Phi(t,\lambda)*h_{ref}(t)dt = \int_T \Phi(t,\lambda)dt$ is obtained based on the definition of the impulse response function, this implies that the pulse energy integrated for the time is the same regardless of shape of the impulse response function, and thus, Equation 2 is simply represented by Equation 3.

$$r(\lambda) = \frac{G_{test}}{G_{ref}} \cdot \frac{p(\lambda)}{\tau(\lambda)} \cdot \frac{S_{test}(\lambda)}{S_{ref}(\lambda)} \quad \text{[Equation 3]}$$

A simple Equation 3 with respect to a signal ratio is effective only when the linearity conditions of quantum efficiency for the input pulse is satisfied for both the reference detector and the measurement target detector. Quantum efficiency of the measurement target detector may be determined based on signal ratio data measured when a parameter of the amplifiers used for the detectors and the beam splitter is quantitatively known and quantum efficiency of the reference detector using Equation 3. However, determining the parameter by an absolute part is associated with an additional system error and an uncertainty of measurement. In addition, in order to measure absolute quantum efficiency, conditions of light incident on the detectors needs to be equal. Therefore, separating relative measurement from absolute measurement at only one fixed wavelength of $\lambda_0$ is a practical solution for a detector scale. The relative quantum efficiency is denoted as $\alpha(\lambda;\lambda_0) \equiv S(\lambda)/S(\lambda_0)$, and different relative amounts such as $\rho(\lambda;\lambda_0) \equiv \rho(\lambda)/\rho(\lambda_0)$, and $\tau(\lambda;\lambda_0) \equiv \tau(\lambda)/\tau(\lambda_0)$ are normalized to a value at the wavelength $\lambda_0$. An equation in accordance with a wavelength of the measured ratio is obtained by dividing Equation 3 by $r(\lambda_0)$.

$$r(\lambda; \lambda_0) \equiv \frac{r(\lambda)}{r(\lambda_0)} = \frac{\rho(\lambda; \lambda_0)}{\tau(\lambda; \lambda_0)} \cdot \frac{s_{test}(\lambda; \lambda_0)}{s_{ref}(\lambda; \lambda_0)} \quad \text{[Equation 4]}$$

Regarding the setup using the beam splitter of FIG. 4, a measurement equation of the relative quantum efficiency of the measurement target detector is finally expressed by Equation 5 in a simple form.

$$s_{test}(\lambda; \lambda_0) = r(\lambda; \lambda_0) \cdot \frac{\tau(\lambda; \lambda_0)}{\rho(\lambda; \lambda_0)} \cdot s_{ref}(\lambda; \lambda_0) \quad \text{[Equation 5]}$$

If a pyroelectric detector is used as a reference detector, since quantum efficiency of the pyroelectric detector is a heat detector relying on an absorbance of a surface of a sensor, Equation 5 may be further simplified. When a total diffuse reflectance, which is a ratio of integrated reflected radiant power with respect to a hemisphere of the entire surface of the sensor of the reference detector, is $\rho_{\alpha/d}(\lambda)$, the absorbance of the reference detector is proportional to [1−ρα/d (λ)]. The angle α may be '0' with respect to normal incidence, but, the angle is set to α=8° or α=6° to include a regular reflectance in a measurement standard for the total diffuse reflectance. If the total diffuse reflectance of the reference detector is measured independently, quantum efficiency of the reference detector may be modeled as $S_{ref}(\lambda)=[1-\rho_{\alpha/d}(\lambda)] \cdot S_0$ based on a proportional factor $S_0$, and thus, a measurement equation for the relative quantum efficiency is as follows.

$$s_{test}(\lambda; \lambda_0) = r(\lambda; \lambda_0) \cdot \frac{\tau(\lambda; \lambda_0)}{\rho(\lambda; \lambda_0)} \cdot (1 - \rho_{\alpha/d})(\lambda; \lambda_0) \quad \text{[Equation 6]}$$

In Equation 6, $$(1 - \rho_{\alpha/d})(\lambda; \lambda_0) \equiv [1 - \rho_{\alpha/d}(\lambda)]/[1 - \rho_{\alpha/d}(\lambda_0)].$$

The transmittance $\tau(\lambda;\lambda_0)$ and the reflectance $\rho(\lambda;\lambda_0)$ of the beam splitter are determined by a method different from the signal ratio measurement, respectively. This limits feasibility and accuracy of the method of using the beam splitter when two detectors with high sensitivity are to be compared. Embodiments of the present invention aim at directly comparing the reference detector and the measurement target detector which are significantly different in sensitivity by about tens of times, and thus, embodiments of the present invention propose a setup modified without using the beam splitter when the pyroelectric detector is used as a reference detector in a comparison measurement.

Figure 5:
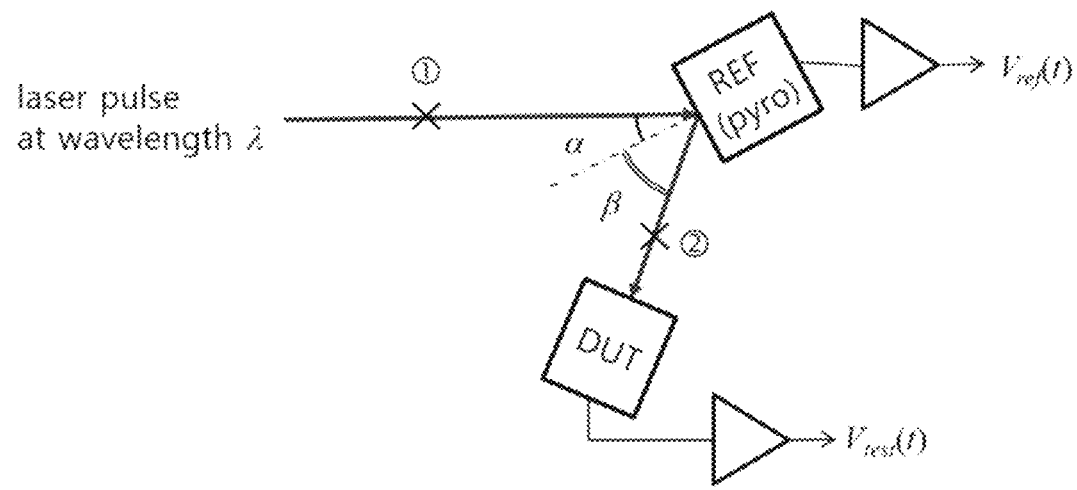
FIG. 5 is a conceptual diagram of a setup for explaining the principle of measuring quantum efficiency when a pyroelectric detector is used as a reference detector.

FIG. 5 is a conceptual diagram of a setup for explaining the principle of measuring quantum efficiency when a pyroelectric detector is used as a reference detector.

Referring to FIG. 5, a pyroelectric detector is used as a reference detector and a photovoltaic detector is used as a measurement target detector and quantum efficiencies of the two detectors are compared. The setup of FIG. 5 is different from that of FIG. 4 in that a beam splitter is not used. Instead, a surface of a sensor of the reference detector reflects a portion of an incident pulse to the measurement target detector, thus serving as a beam splitter. When an incident angle and a detection angle of laser light are marked as α and β, respectively, on the surface of the reference detector, radiant power of the reflected light over time at the wavelength λ measured at the position of ② of FIG. 5 may be expressed as $\rho_{\alpha/\beta}(\lambda) \cdot \Phi(t,\lambda)$. Here, $\rho_{\alpha/\beta}(\lambda)$ is a spectral reflectance of the surface of the reference detector under a given geometrical condition, and $\Phi(t,\lambda)$ denotes incident power measured at the position of ①. In actuality, when α=β is selected for the advantage of a condition close to regular reflection, i.e., setup alignment, $\rho_{\alpha/\beta}(\lambda)$ corresponds to attenuation of a pulse strength required for connecting a sensitivity difference between the pyroelectric detector and the photovoltaic detector. A measurement equation for relative quantum efficiency of the measurement target detector in the setup of FIG. 5 is derived as expressed by Equation 6.

$$s_{test}(\lambda; \lambda_0) = r(\lambda; \lambda_0) \cdot \frac{(1 - \rho_{\alpha/d})(\lambda; \lambda_0)}{\rho_{\alpha/\beta}(\lambda; \lambda_0)} \quad \text{[Equation 7]}$$

Hereinafter, the signal processing part 600 for calculating relative quantum efficiency $S_{test}(\lambda;\lambda_0)$ of the measurement target detector of Equation 7 will be described.

Referring to FIG. 3, examples of the first voltage signal $V_{ref}(t)$ and the second voltage signal $V_{test}(t)$, respectively, after a photocurrent signal generated in the reference detector and the measurement target detector under measurement passes through an amplifier. In order to determine the ratio of the pulse response signals $y_{ref}$ and $y_{test}$ defined in Equation 1, the recording part records the first and second voltage signals. The recorded voltage signals are digitized and a DC offset thereof is removed by an offset removing part. The DC offset is removed by subtracting an offset level determined by averaging the signals before the pulse arrives. With the signal without the DC offset, the integrating part calculates $y_{ref}$ and $y_{test}$ for a predefined integration time. The same integration time is applied to match a slower signal among the two signals as the reference detector and the measurement target detector signals. The signal ratio calculating part calculates and stores the ratio r(λ) defined in Equation 1 as result data for a single incident laser pulse at the wavelength λ. Since the OPO pulse laser repetition rate is 1 kHz, 1000 r(λ) data may be recorded per second. A quantum efficiency calculating part calculates relative quantum efficiency of the measurement target detector through the total diffuse reflectance of the reference detector recorded in the recording part and the signal ratio calculated by the signal ratio calculating part.

The signal processing part 600 also includes a linearity determining part determining whether the recorded data is measured within the linear dynamic range of the detectors and the amplifiers. The measurement equations of Equations 1 to 7 are valid only when the linearity condition of quantum efficiency with respect to the input pulse is satisfied for both the reference detector and the measurement target detector. The linearity determining part determines whether the linearity condition is satisfied by observing shapes of the first voltage signal $V_{ref}(t)$ and the second voltage signal $V_{test}(t)$ from the detectors. If the second voltage signal of FIG. 3 has distortion as a rising and falling exponential function, this indicates saturation of quantum efficiency of the measurement target detector near a peak of the pulse. Since the pyroelectric detector is optimized for a higher radiant power range than most photovoltaic detectors, it is expected that saturation of quantum efficiency of the measurement target detector will occur first.

Figure 6:
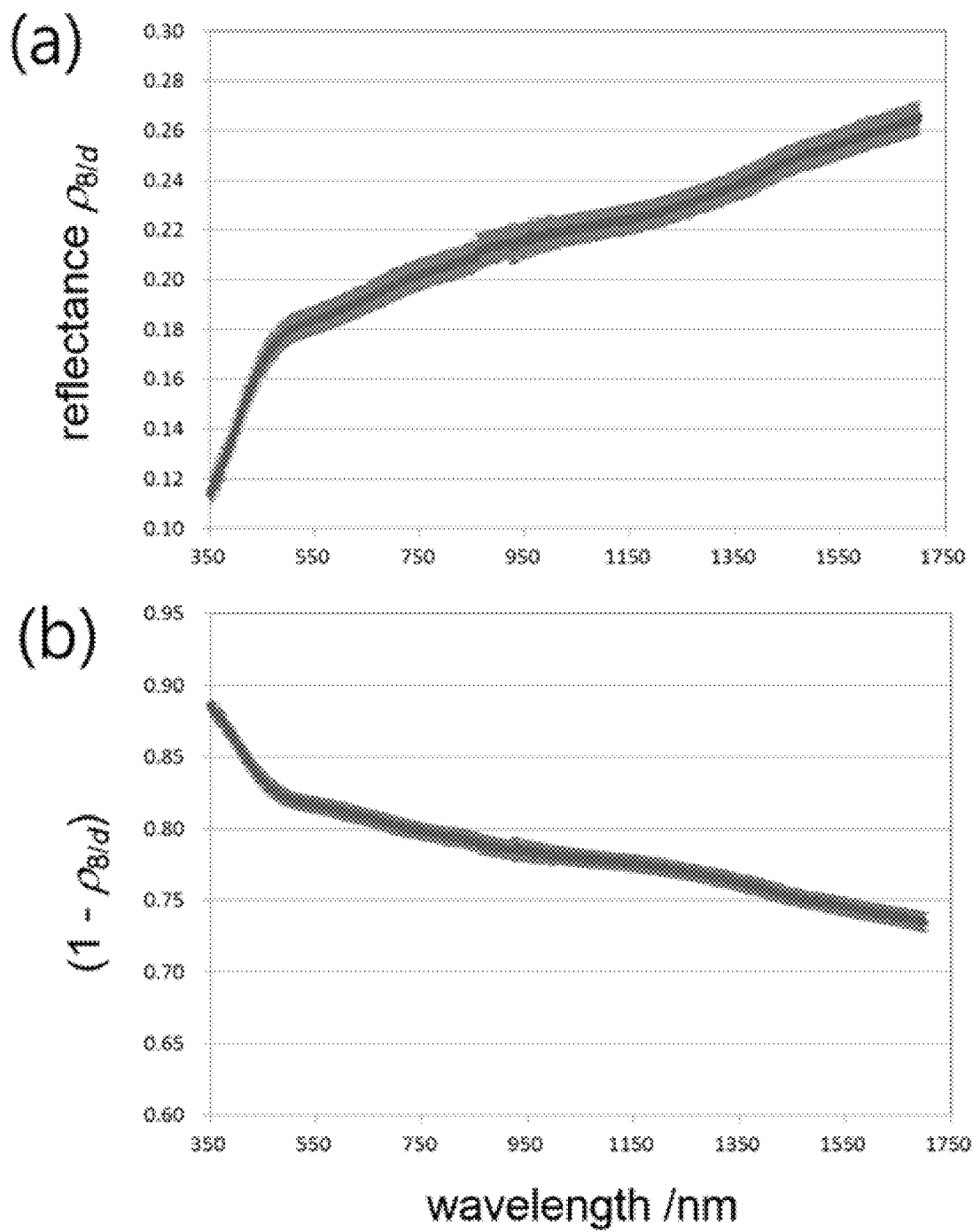
FIG. 6 shows graphs illustrating a total diffuse reflectance and spectral absorbance of a surface of a reference detector at an incident angle of 8°/di geometrical condition.

FIG. 6 is a graph illustrating a total diffuse reflectance and spectral absorbance of a surface of a reference detector at an incident angle of 8°/di geometrical condition.

Equation 7, which is a measurement equation for relative quantum efficiency of the measurement target detector for direct comparison without a beam splitter, requires data of the total diffuse reflectance $\rho_{\alpha/d}(\lambda)$. The total diffuse reflectance from 350 nm to 1700 nm is measured using a spectrophotometer. The measurement result of the total diffuse reflectance at the geometrical condition of 8°/di for the pyroelectric detector as the reference detector is shown in (a) of FIG. 6. Therefore, an absorbance of the reference detector is $[1-\rho_{\alpha/d}(\lambda)]$ shown in (b) of FIG. 6 and is recorded in the recording part of the signal processing part.

The results of (a) of FIG. 6 shows that reflectance of the reference detector changes gently from 0.11 to 0.27 when the wavelength varies from 350 nm to 1700 nm. The uncertainty of measurement of the total diffuse reflectance is a relative expanded uncertainty having a coverage factor k=2 with respect to a confidence level of about 95% is evaluated as 2% to 4% according to wavelengths and is indicated as gray error bars. The relative expanded uncertainty of the calculated amount $[1-\rho_{8/d}(\lambda)]$ is in the range of 0.5% to 0.9% (k=2).

Regarding Equation 7, more data is required for the reflectance $\rho_{\alpha/\beta}(\lambda)$ of the reference detector for a regular reflection condition $\alpha=\beta=8°$. Through further experiment, it was concluded that the regular reflectance $\rho_{8/8}(\lambda)$ of the reference detector does not show spectral dependence and a difference of the measured values is negligible within the uncertainty, and as a result, the relative regular reflectance $\rho_{8/8}(\lambda;\lambda_0)$ has the same uncertainty as the relative uncertainty of $\rho_{8/d}(\lambda)$ and a value thereof is set to "1".

Figure 7:
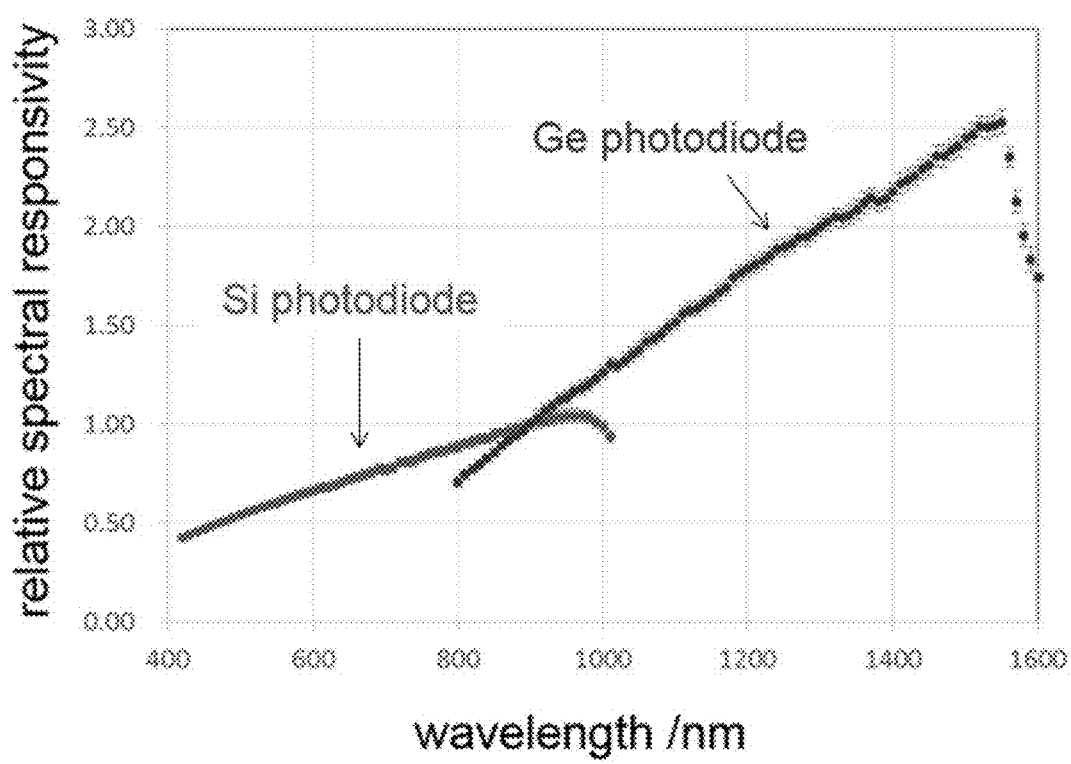
FIG. 7 is a graph illustrating a result of measuring relative quantum efficiency of a measurement target detector from 420 nm to 1600 nm in wavelength.

FIG. 7 is a graph illustrating a result of measuring relative quantum efficiency of a measurement target detector from 420 nm to 1600 nm in wavelength.

Referring to FIG. 7, the measurement results of relative quantum efficiency of a Si photodiode and a Ge photodiode with the measurement target detector according to an embodiment of the present invention are plotted in blue and red, respectively. The Si photodiode is measured from 420 nm to 1010 nm, while the Ge photodiode is measured from 800 nm to 1600 nm. All results are normalized at $\lambda_0=900$ nm. A relative expanded uncertainty of this measurement is indicated by the error bar in FIG. 7. In the case of Ge photodiode in which the photodiode exhibits abnormally large random noise, the relative expanded uncertainty is within the range of 2% to 4% (k=2), except for some data below 850 nm.

FIG. 8 is a flowchart illustrating a method of measuring quantum efficiency of a detector using a single pulse laser according to an embodiment of the present invention.

Referring to FIG. 8, a method for measuring quantum efficiency of a detector through a detector quantum efficiency measuring apparatus using a single pulse laser according to an embodiment of the present invention includes irradiating a reference detector with a laser pulse output from the light source part 100 in operation S110, absorbing, by a reference detector, a portion of the laser pulse output from the light source part, to generate a photocurrent, allowing a portion of the laser pulse to be reflected so as to be incident on a measurement target detector so that the measurement target detector absorbs the laser pulse reflected from the reference detector to generate a photocurrent in operation S120, converting, by first and second amplifiers, the photocurrent signals generated by the two detectors into first and second voltage signals in operation S130, measuring a total diffuse reflectance $\rho_{\alpha/d}(\lambda)$ of the reference detector in operation S140, recording the first and second voltage signals and the total diffuse reflectance of the reference detector in operation S150, removing a DC offset of the first voltage signal and the second voltage signal in operation S160, integrating the DC offset-removed two voltage signals in operation S170, calculating a signal ratio $r(\lambda)$ through $y_{ref}$ and $y_{test}$ obtained by integrating the two voltage signals in operation S180, and calculating relative quantum efficiency of the measurement target detector through the total diffuse reflectance of the reference detector and the signal ratio in operation S190.

The method further includes determining whether pulse energy output from the light source part is measured within a linear dynamic range of the reference detector, the measurement target detector, the first amplifier, and the second amplifier through a pulse form of the first voltage signal and the second voltage signal, and when the pulse energy operates within the linear dynamic range, the first and second voltage signals are recorded in the recording part, and when the pulse energy is outside the linear dynamic range, the process is returned to the operation of irradiating the reference detector with a laser beam and an output of the laser pulse is adjusted through a photo attenuator 900, the optical fiber 700, and/or the first and second apertures 810 and 820. Here, the method may further include coupling the laser pulse output from the light source part to the optical fiber. Through this operation, the range of the wavelength of measuring quantum efficiency of the measurement target detector may extend from a minimum 250 nm to a maximum 2400 nm.

In the apparatus and method for measuring quantum efficiency of a detector using a single pulse laser according to an embodiment of the present invention, quantum efficiency of the measurement target detector may be measured from 420 nm to 1600 nm having an uncertainty of 2% to 4% (K=2) by comparing signals from the reference detector and the measurement target detector significantly different in sensitivity using a single laser pulse as a spectral light source.

Also, by applying a signal acquisition procedure for selecting only a signal within the linear dynamic range of the laser pulse, nonlinearity of quantum efficiency of the detector due to high energy of the laser pulse may be overcome.

Moreover, it is possible to directly compare the two detectors with a significant difference in sensitivity and reduce an uncertainty of measurement through a very simple setup that causes a beam reflected from the reference detector to be irradiated onto the measurement target detector.

What is claimed is:
1. An apparatus for measuring quantum efficiency of a detector using a single pulse laser, the apparatus comprising:
   a light source part outputting a laser pulse;
   a reference detector absorbing a portion of the laser pulse output from the light source part and converting the absorbed portion of the laser pulse into a current signal;
   a measurement target detector absorbing a laser pulse reflected from the reference detector and converting the absorbed laser pulse into a current signal;
   a first amplifier amplifying the current signal generated by the reference detector to a first voltage signal;
   a second amplifier amplifying the current signal generated by the measurement target detector to a second voltage signal; and
   a signal processing part recording the first voltage signal and the second voltage signal and calculating quantum efficiency of the measurement target detector.

2. The apparatus of claim 1, further comprising:
   an optical fiber coupling the laser pulse output from the light source part to fix a position of the laser pulse and maintaining a circular shape.

3. The apparatus of claim 1, wherein the signal processing part includes:
   a recording part recording the first voltage signal and the second voltage signal and a total diffuse reflectance of the reference detector;

an offset removing part removing a DC offset of the first voltage signal and the second voltage signal;

an integrating part integrating the first voltage signal and the second voltage signal from which the DC offset was removed by the offset removing part;

a signal ratio calculating part calculating a signal ratio; and a quantum efficiency calculating part calculating relative quantum efficiency of the measurement target detector through the total diffuse reflectance of the reference detector and the signal ratio.

4. The apparatus of claim 3, wherein the measurement target detector is disposed to form a predetermined incident angle with respect to a normal of a surface of the reference detector when the laser pulse output from the light source part is incident on the surface of the reference detector and absorbs a laser pulse passing on a straight line forming the same angle of reflection as the incident angle.

5. The apparatus of claim 3, wherein the signal processing part includes a linearity determining part determining whether the first voltage signal and the second voltage signal are measured within a linear dynamic range of the reference detector, the measurement target detector, the first amplifier, and the second amplifier.

6. A method for measuring quantum efficiency of a detector through a detector quantum efficiency measuring apparatus using a single pulse laser, the method comprising:

irradiating a reference detector with a laser pulse output from a light source part;

absorbing, by the reference detector, a portion of the laser pulse output from the light source part to generate a photocurrent, and absorbing, by a measurement target detector, a laser pulse reflected from the reference detector to generate a photocurrent;

converting, by a first amplifier and a second amplifier, the photocurrent signals generated by the reference detector and the measurement target detector into a first voltage signal and a second voltage signal;

measuring a total diffuse reflectance of the reference detector;

recording the first voltage signal and second voltage signal and the total diffuse reflectance of the reference detector;

removing a DC offset of the first voltage signal and the second voltage signal;

integrating the DC offset-removed the first voltage signal and the second voltage signal;

calculating a signal ratio; and calculating relative quantum efficiency of the measurement target detector through the total diffuse reflectance of the reference detector and the signal ratio.

7. The method of claim 6, further comprising:

after the measuring a total diffuse reflectance of the reference detector, determining whether the first voltage signal and the second voltage signal are measured within a linear dynamic range of the reference detector, the measurement target detector, the first amplifier, and the second amplifier.

8. The method of claim 6, wherein the irradiating a reference detector with a laser pulse output from a light source part comprises coupling the laser pulse output from the light source part to an optical fiber.

* * * * *